United States Patent [19]

Matsumasa et al.

[11] Patent Number: 5,712,056
[45] Date of Patent: Jan. 27, 1998

[54] SEALED BATTERY

[75] Inventors: Yoshitaka Matsumasa, Chigasaki; Jiro Konagawa, Naga-gun; Mitsuru Naniwa, Chigasaki; Norio Suzuki, Chigasaki; Toshihisa Hiroshima, Chigasaki, all of Japan

[73] Assignee: Matsushita Electric Industrial Co., Ltd., Osaka-Fu, Japan

[21] Appl. No.: 758,830

[22] Filed: Dec. 4, 1996

[30] Foreign Application Priority Data

Feb. 28, 1996 [JP] Japan ................. 8-041591
Feb. 28, 1996 [JP] Japan ................. 8-041592

[51] Int. Cl.$^6$ ................................. H01M 2/12
[52] U.S. Cl. ................ 429/54; 429/82; 220/203.11
[58] Field of Search .................. 429/53, 54, 57, 429/72, 82; 220/203.11, 203.01, 202

[56] References Cited

U.S. PATENT DOCUMENTS

| | | | |
|---|---|---|---|
| 4,237,593 | 12/1980 | Wolf | 429/54 X |
| 4,298,662 | 11/1981 | Sugalski et al. | 429/50 |
| 4,662,533 | 5/1987 | Takahashi et al. | |
| 4,780,378 | 10/1988 | McCartney et al. | 429/54 |
| 5,372,897 | 12/1994 | Kozawa et al. | 429/54 |

FOREIGN PATENT DOCUMENTS 5-041204 A  2/1993  Japan.

*Primary Examiner*—Anthony Skapars
*Attorney, Agent, or Firm*—Panitch Schwarz Jacobs & Nadel, P.C.

[57] ABSTRACT

The present invention provides a sealed battery having a large capacity by using a thin safety valve device so as to increase a volume of a cell element. The sealed battery has a high safety owing to the thin safety valve device having an elastic valve element comprising an ethylene-propylene elastomer and thermoplastic resin particles dispersed in the ethylene-propylene elastomer. The elastic valve element is produced by mixing thermoplastic resin particles with an ethylene-propylene elastomer material, molding the mixture into a predetermined shape and, at the same time, crosslinking the ethylene-propylene elastomer material.

11 Claims, 5 Drawing Sheets

SEALED BATTERY

FIELD OF THE INVENTION

The present invention relates to a sealed battery, particularly a safety valve device for enhancing a safety of the sealed battery, more particularly an improvement in gas exhaust capability of the battery at high temperature.

BACKGROUND OF THE INVENTION

With the progress of various portable apparatuses, there has recently been utilized a battery, particularly rechargeable secondary battery, in the wide fields. As the battery used for these apparatuses, a lead acid battery and a nickel-cadmium battery have hitherto been used. In addition to them, a nickel-metal hydride battery and a lithium secondary battery are also used at present.

Among these secondary batteries, a battery using an aqueous electrolyte (e.g. lead acid battery, nickel-cadmium battery, nickel-metal hydride battery, etc.) employs the so-called Neumann system. This system is such that a capacity of a negative electrode is set to be larger than that of a positive electrode at a certain value, in order to prevent an increase in internal pressure of the battery by absorbing an oxygen gas evolved at the positive electrode in case of overcharge, into the negative electrode.

On the other hand, regarding a battery using an non-aqueous electrolyte (e.g. lithium secondary battery, etc.), a gas can not be consumed within the battery. Therefore, a trial of sealing the battery has been made by avoiding overcharge and overdischarge and inhibiting a gas from evolving.

However, regarding the sealed battery, the internal pressure of the battery is increased, thereby sometimes causing breakage, when the situation becomes abnormal because of trouble of battery charger, wrong use, external short-circuiting, etc. In order to prevent the battery from breakage, these batteries are normally equipped with a safety valve device so that a gas evolved within the battery escapes outside when the internal pressure of the battery exceeds a predetermined value.

Hereinafter, the safety valve device for sealed battery will be described in detail.

Figure 7:
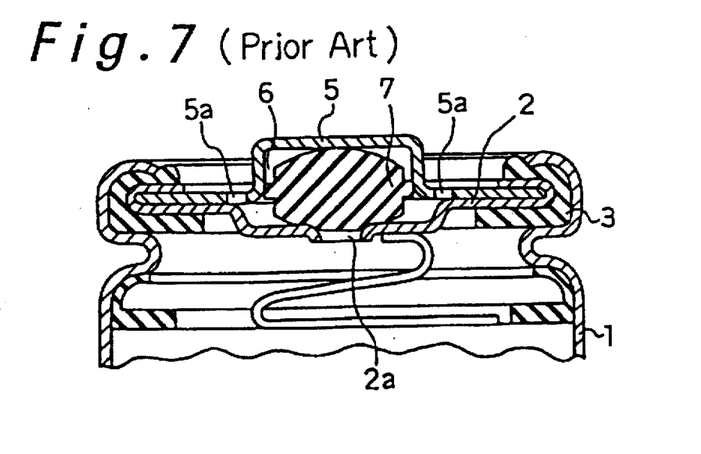
FIG. 7 is a longitudinal sectional view illustrating the principal part of a sealed battery installed with a conventional safety valve device.

FIG. 7 is a longitudinal sectional view illustrating the upper part of a sealed battery. A metal seal plate 2 having a gas vent hole 2a at the central part is installed at an upper opening part of a metal battery case 1 with a gasket 3 serving to maintain insulating properties and airtightness therebetween.

An electrode assembly obtained by laminating a positive electrode, a negative electrode and a separator sandwiched therebetween, followed by rolling them together spirally, and an alkaline electrolyte (not shown) are housed in the case 1. The seal plate 2 is further provided with a cap-shaped positive terminal 5 which also serves as a constituent part of the safety valve device. A gas exhaust hole 5a is formed on a part of the positive terminal 5. An elastic valve element 7 made of a rubber is assembled into a valve chamber 6 composed of a space surrounded with the positive terminal 5 and the seal plate 2 in a state of being compressed. Normally, the elastic valve element 7 closely adheres to the gas vent hole 2a of the seal plate 2 and shuts the gas vent hole 2a, thereby isolating the inside of the battery from the outside. Instead of the elastic valve element 7 made of a rubber, a valve element using a metal spring and a valve plate may be used in general.

Regarding the sealed battery having the above construction, when an increase in internal pressure of the battery is caused by an inflow of an excess charged current due to trouble of a battery charger or overdischarge involving inversion of potential and the internal pressure reaches a valve opening pressure, a gas within the case pushes up the elastic valve element 7 of the safety valve device and escapes from the gas exhaust hole 5a of the positive terminal 5. When the internal pressure in the battery decreases, the elastic valve element 7 returns to an original shape and it becomes possible to use the safety valve device again. The safety valve device works so that the gas is discharged outside when the internal pressure of the battery exceeds a valve opening pressure. The valve opening pressure is normally set at about 10 $kg/cm^2$.

With the increase of consumption of electric power of apparatuses using a battery due to increase of its function, there is a demand for a battery having an increased capacity. Since an external shape of the battery is standardized, a reduction in thickness of the safety valve device is required as one of means for realizing the large-capacity battery. That is, the volume of the safety valve device is decreased by reducing the thickness thereof, thereby increasing a volume of a cell element. The thickness of the safety valve device is reduced by shallowing the dish-type opening seal plate 2 and decreasing the height of the cap-type positive terminal 5.

In the case of using a thin safety valve device, when overcharge is conducted to a degree that no rapid gas evolution arises, a gas evolution rate is small and, therefore, the internal pressure of the battery gradually increases. When the internal pressure reaches a valve opening pressure of the safety valve, the safety valve device normally functions and the gas within the battery escapes outside. However, when a large current exceeding a predetermined value is passed to the battery and the gas is rapidly evolved within the battery, the elastic valve element is deformed by an increase in pressure. Even if a trial of discharging the gas is made, the discharge rate from the gas exhaust hole can not follow the gas evolution rate within the battery because of small valve chamber, that is, small deformation amount of the elastic valve element. Therefore, the internal pressure of the battery rapidly increases, which leads to breakage of the battery. Also, the elastic valve element is thermally expanded over the valve chamber due to an increase in temperature within the battery and the valve element can not maintain its working capability. Therefore, the internal pressure of the battery increases and then the battery reaches breakage.

On the other hand, in order to enable rapid charging, a countermeasure may be taken like increasing the preset value of the valve opening pressure of the safety valve device to about 20 $kg/cm^2$ by increasing a hardness of the elastic material used for the elastic valve element of the safety valve device or increasing compressibility of the elastic valve element, thereby decreasing deformability of the valve element. However, such countermeasure is insufficient to solve the above problem.

Japanese Laid-Open Patent Publication (Tokkai-Hei) 5-41204 suggests that a melting point of a packing material or an elastic valve element is adjusted to not more than 270° C. so as to obtain a safety in case of throwing the battery into fire. However, such a battery has a risk that, when an excess current is passed to the battery and the temperature of the battery rapidly reaches about 100° C., the internal pressure of the battery rapidly increases and the battery is broken. The battery suggested by the above publication paper has a problem of a countermeasure to an inflow of an excess current.

The above publication paper also discloses that an olefin thermoplastic elastomer is used for the elastic valve element.

3

However, according to the construction, when the temperature of the battery increases, the thermoplastic elastomer is softened or melted and the valve opening pressure is drastically lowered and, therefore, the gas vent hole substantially becomes a state of being opened. As a result, open air flows into the battery through the gas vent hole in the state of being opened and an oxidation of a hydrogen storage alloy negative electrode is accelerated and, therefore, the battery is likely to induce ignition. The above publication paper also suggests that a natural rubber, a styrene-butadiene rubber or an ethylene-propylene elastomer is used as the elastic valve element material. Among them, the ethylene-propylene elastomer is most excellent. However, since a rubber-like elasticity is deteriorated with time due to oxidation and the valve opening pressure of the safety valve device decreases, a satisfactory long-term reliability can not be obtained. In such way, even if any rubber described above is used as the elastic valve element, a long-term reliability (such as prevention of leakage of electrolyte) is not easily obtained.

SUMMARY OF THE INVENTION

The object of the present invention is to provide a sealed battery having high reliability to maintain a stable valve opening pressure for a long period, and high safety to avoid a risk such as breakage caused by an increase in internal pressure of the battery, which can make the valve opening action follow a rapid increase of the internal pressure of the battery.

The sealed battery of the present invention comprises a battery case containing a cell element, and a safety valve device installed at an opening part of the battery case, in which said safety valve device includes;

a dish-shaped seal plate having a gas vent hole at a central part, a cap-shaped terminal having a gas exhaust hole fixed to said dish-type seal plate at a peripheral edge thereof, and an elastic valve element provided in a valve chamber formed in a space between the dish-shaped seal plate and the cap-shaped terminal, the valve element being in a compressed state, wherein the elastic valve element comprises an ethylene-propylene elastomer and thermoplastic resin particles dispersed in the ethylene-propylene elastomer, the thermoplastic resin particles have a softening point lower than that of the ethylene-propylene elastomer, and the thermoplastic resin particles contained in the elastic valve element occupy from 5 to 30% by weight of the whole elastic valve element.

The another sealed battery of the present invention comprises a battery case containing a cell element, and a safety valve device installed at an opening part of the battery case in which said safety valve device includes;

a dish-shaped seal plate having a gas vent hole at a central part, a cap-shaped terminal having a gas exhaust hole fixed to the dish-shaped seal plate at a peripheral edge thereof, and an elastic valve element provided in a valve chamber formed in a space between the dish-shaped seal plate and the cap-shaped terminal, the valve element being in a compressed state, wherein the elastic valve element comprises an ethylene-propylene elastomer and resin particles of at least one thermoplastic resin selected from the group consisting of an olefin resin, a styrene resin and an amide resin, dispersed in the ethylene-propylene elastomer, and the resin particles contained in the elastic valve element occupy from 5 to 30% by weight of the whole elastic valve element.

Accordingly, this elastic valve element substantially has a structure that the resin particles of the thermoplastic resin are dispersed in the ethylene-propylene elastomer.

According to the above construction, when the temperature of the battery rises rapidly since a large current of not less than a predetermined value flows into the battery and a gas is abnormally evolved within the battery, the resin particles in the elastomer are softened as the temperature of the battery rises and the working pressure of the elastic valve element is lowered, thereby substantially increasing a gas exhaust rate from the gas exhaust hole. Thus, the gas exhaust rate can follow a gas evolution rate and, therefore, breakage of the battery can be prevented by inhibiting an increase in internal pressure of the battery.

In addition, since the elastic valve element mainly consists of the elastomer, when the internal pressure of the battery decreases, the elastic valve element shuts the gas exhaust hole again due to its elasticity and it is possible to prevent the gas exhaust hole from opening for a long term, and hence further high safety is obtained.

It is preferred that a softening temperature of the resin particles is lower than that of said ethylene-propylene elastomer.

It is preferred that the valve opening pressure of the safety valve device is lowered due to a plastic deformation of the elastic valve element caused by an increase in temperature.

It is also preferred that the valve opening pressure of the safety valve device at the temperature of 100° to 120° C. is lowered to 60 to 20% of the valve opening pressure at room temperature.

Another sealed battery of the present invention comprises a battery case containing a cell element, and a safety valve device installed at an opening part of the battery case in which the safety valve device includes;

a dish-shaped seal plate having a gas vent hole at a central part, a cap-shaped terminal having a gas exhaust hole, fixed to the dish-shaped seal plate at a peripheral edge thereof, and an elastic valve element provided in a valve chamber formed in a space between the dish-shaped seal plate and the cap-shaped terminal, the valve element being in a compressed state, wherein the elastic valve element is produced by mixing resin particles of at least one thermoplastic resin selected from the group consisting of olefin resin, styrene resin and amide resin, and an ethylene-propylene elastomer material, molding the mixture into a predetermined shape and, at the same time, crosslinking the ethylene-propylene elastomer material.

Still another sealed battery of the present invention comprises a battery case containing a cell element, and a safety valve device installed at an opening part of the battery cell, wherein the safety valve device includes;

a dish-shaped seal plate having a gas vent hole at a central part, a cap-shaped terminal having a gas exhaust hole, fixed to the dish-shaped seal plate at a peripheral edge thereof, and an elastic valve element provided in a valve chamber formed in a space between the dish-shaped seal plate and the cap-shaped terminal, the valve element being in a compressed state, wherein the elastic valve element having a thickness of not less than 1.0 mm in a state free from compression, wherein the elastic valve element is provided in the space constituting the valve chamber in a state of being compressed by an amount of 10 to 50% of the thickness.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF PREFERRED EMBODIMENTS

The embodiments of the present invention will now be described in detail with reference to the drawings.

Figure 1:
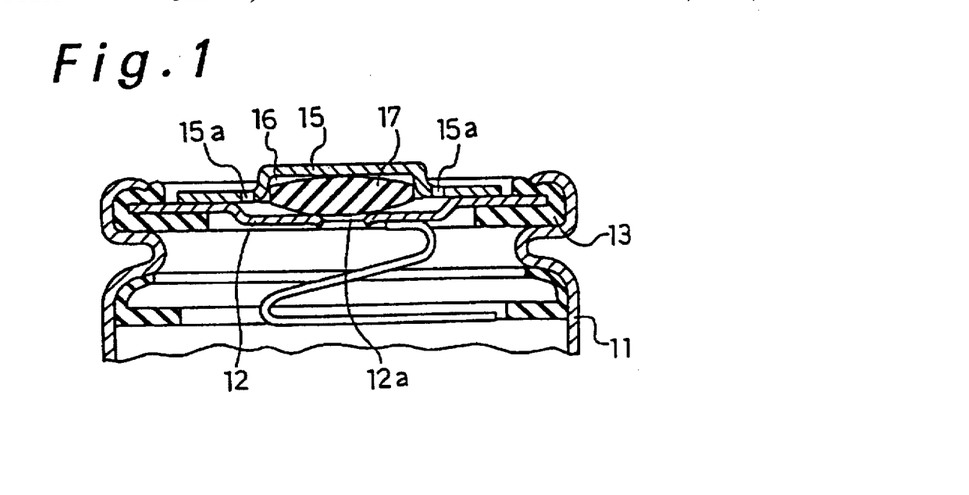
FIG. 1 is a longitudinal sectional view illustrating the principal part of a sealed battery installed with a thin safety valve device as one embodiment of the present invention.

FIG. 1 is a longitudinal sectional view illustrating the upper part of a sealed battery using a thin safety valve device.

A thin safety valve device is composed of a shallow dish-shaped seal plate 12, a low cap-shaped positive terminal 15 spot-welded at the central part on the surface of the seal plate 12 and a thin elastic valve element 17 provided in a valve chamber 16 of a space between the seal plate 12 and the positive terminal 15 in a state of being compressed, and the safety valve device is installed by caulking at an opening part of a metal battery case 11 containing a cell element, while simultaneously placing a gasket 13 serving to maintain insulating properties and airtightness therebetween. A gas exhaust hole 15a is formed on the flange part of the positive terminal 15 and a gas vent hole 12a is formed on the central part of the seal plate 12. The elastic valve element 17 in the valve chamber 16 is provided close to the seal plate 12 in a state being compressed by the positive terminal, thereby shutting the gas vent hole 12a placed thereunder.

EXAMPLE 1

Using polypropylene, which is a kind of an olefin resin, as particles of a thermoplastic resin, a mixing ratio of the resin particles and an ethylene-propylene-elastomer in an elastic-valve element 7 was examined.

This polypropylene particles having an average particle size of 20 μm was mixed with ethylene-propylene-diene-monomer (hereinafter referred to as "EPDM") that is a ethylene-propylene elastomer material so that the polypropylene powder occupies 30% by weight, 15% by weight or 5% by weight, and then a suitable amount of a vulcanizing agent was further added. The resultant mixture was molded into a valve element shape and, at the same time, the EPDM was crosslinked by heating it at 180° C. for about 5 minutes to obtain an elastic valve element. The valve element whose ratio of the thermoplastic resin particles is 30% by weight, 15% by weight or 5% by weight is referred to as a valve element A, B or C, respectively. A thin safety valve device shown in FIG. 1 was made by using the elastic valve element thus obtained. The safety valve device using the valve element A, B or C is referred to as a safety valve device A, B or C, respectively.

As Comparative Examples, a safety valve device D using a valve element D obtained by mixing the same polypropylene particles with EPDM in a ratio of 50% by weight and molding the resultant mixture into a valve element shape and, at the same time, crosslinking the EPDM, and a conventional safety valve device E using a valve element E molded from only EPDM were produced.

A thickness of each valve element was 2.0 mm (50% of a thickness of an elastic valve element used for a conventional safety valve device) and a compressibility during installation into the safety valve device was set at 30%.

Using the safety valve devices A, B and C obtained as described above, A-size sealed nickel-metal hydride batteries each having a nominal capacity of 1600 mAh were produced. These batteries are referred to as batteries "a", "b" and "c", respectively.

Using the safety valve devices D and E as the Comparative Examples, the same sealed nickel-metal hydride batteries were produced. These batteries are referred to as batteries "d" and "e", respectively.

Five kinds of the above batteries "a" to "e" (50 batteries for each) were subjected to a breakage test on the assumption of control failure of a battery charger while performing a continuous overcharge at a current of 8 A (corresponding to 5 C). The results are shown in Table 1.

TABLE 1

| Kind of battery | 8 A continuous overcharge | |
|---|---|---|
| | number of batteries broken | number of batteries causing ignition |
| Battery a | 0/50 | 0/50 |
| Battery b | 0/50 | 0/50 |
| Battery c | 0/50 | 0/50 |
| Battery d | 0/50 | 11/50 |
| Battery e | 48/50 | 0/50 |

As shown in Table 1, no breakage or ignition was observed in the batteries "a", "b" and "c".

To the contrary, regarding the battery "d" as the Comparative Example, of the 50 batteries, 11 batteries caused ignition. The reason for this is considered as follows. That is, since the amount of the resin particles contained in the elastic valve element was too large, when the temperature of the battery increased and the resin particles in the elastic valve element were softened, the valve opening pressure was excessively lowered and therefore, even after discharging a gas, the gas vent hole 12a of the seal plate 12 keeps a state of being opened, thereby to allow the open air to flow into the battery. With the battery "e", of the 50 batteries, 48 batteries were broken. The reason for this is considered as follows. That is, the elastic valve element was thermally expanded by an increase in temperature of the battery and adhered to the seal plate 12 and positive terminal 15 which constitutes the valve chamber 16, thereby deteriorating a discharge capability. As a result, it is considered that the incidence of a breakage in such batteries is higher than the battery using the conventional thick-type safety valve device, due to reduced thickness of the safety valve device.

Figure 2:
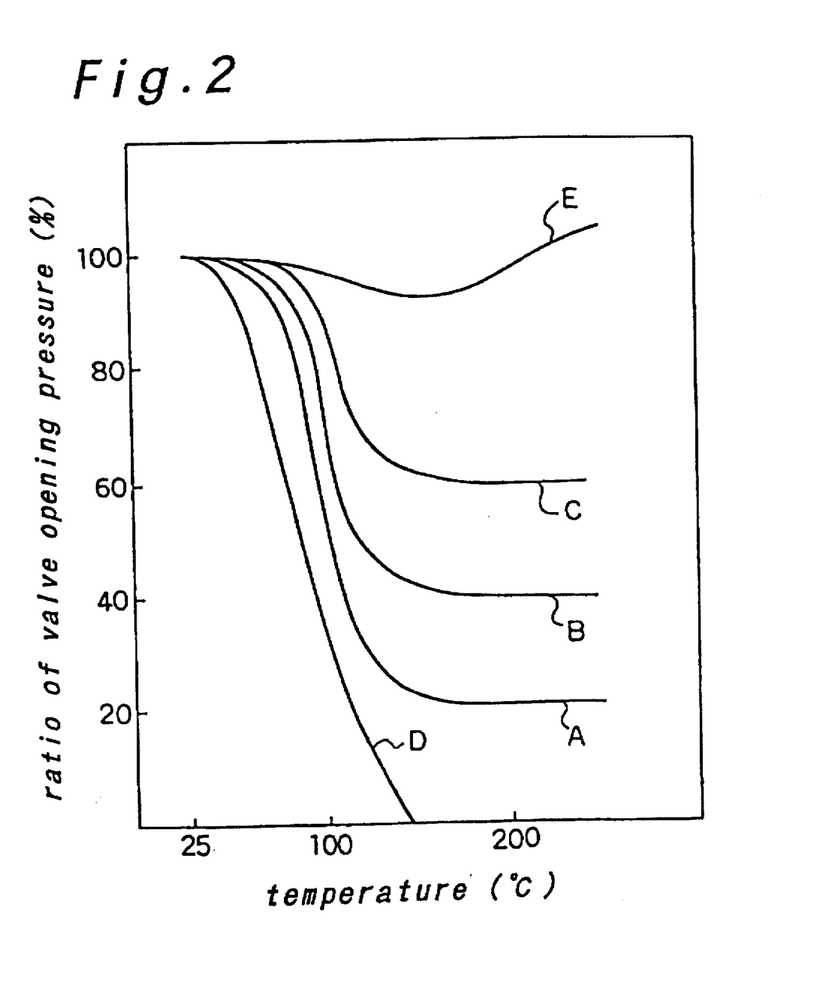
FIG. 2 is a characteristic graph illustrating a relation between a ratio of working pressure of a safety valve device for a battery in one embodiment of the present invention and a temperature.

Next, a relation between the valve opening pressure of the safety valve devices A to E used for the batteries "a" to "e" and the temperature was examined so as to confirm the above results. The results are shown in FIG. 2. The valve opening pressure represents a ratio if a value at room temperature (25° C.) is defined 100.

As shown in FIG. 2, the valve opening pressure of the safety valve devices A, B and C of the present invention begins to decrease at about 100° C. due to softening of the resin particles in the elastic valve element. As the amount of the resin particles contained in the valve element becomes higher, the temperature at which a reduction in valve opening pressure begins becomes lower. When the temperature increases furthermore, the valve opening pressure is lowered to 60 to 20% of a value at room temperature and indicates a nearly constant value at the temperature higher than that. In such way, the valve opening pressure of the safety valve devices A, B and C is lowered by softening of the resin particles in the elastic valve element caused by an increase in temperature. The gas exhaust capability at high temperature is improved but the sealing capability at the gas exhaust hole of the elastic valve element is maintained by the ethylene-propylene elastomer. Accordingly, as shown in Table 1, the batteries using these elastic elements show high safety.

On the other hand, in the safety valve device D, the valve opening pressure is excessively lowered by softening of the resin particles in the valve element when the temperature rises, and the valve element loses the sealing capability. This reflects the results shown in Table 1.

As is apparent from the above results, when the mixing ratio of the resin particles to the whole elastic valve element is not less than 5% by weight, the valve opening pressure of the safety valve device is lowered by softening of the resin particles due to increased temperature, thereby increasing the gas exhaust rate from the gas vent hole, even if a gas is abnormally evolved within the battery. On the other hand, when the mixing ratio of the resin particles is not more than 30% by weight, the crosslinked structure of the ethylene-propylene elastomer is maintained even if the resin particles are softened at high temperature, and an excess decrease in valve opening pressure is prevented by the capability of the ethylene-propylene elastomer. Accordingly, when the safety valve device is used for the nickel-metal hydride battery or lithium secondary battery, the gas vent hole does not keep the state of being opened for long time. Therefore, when the resin particles are softened due to increased temperature, ignition caused by inflow of the air into the battery can be prevented.

Figure 3:
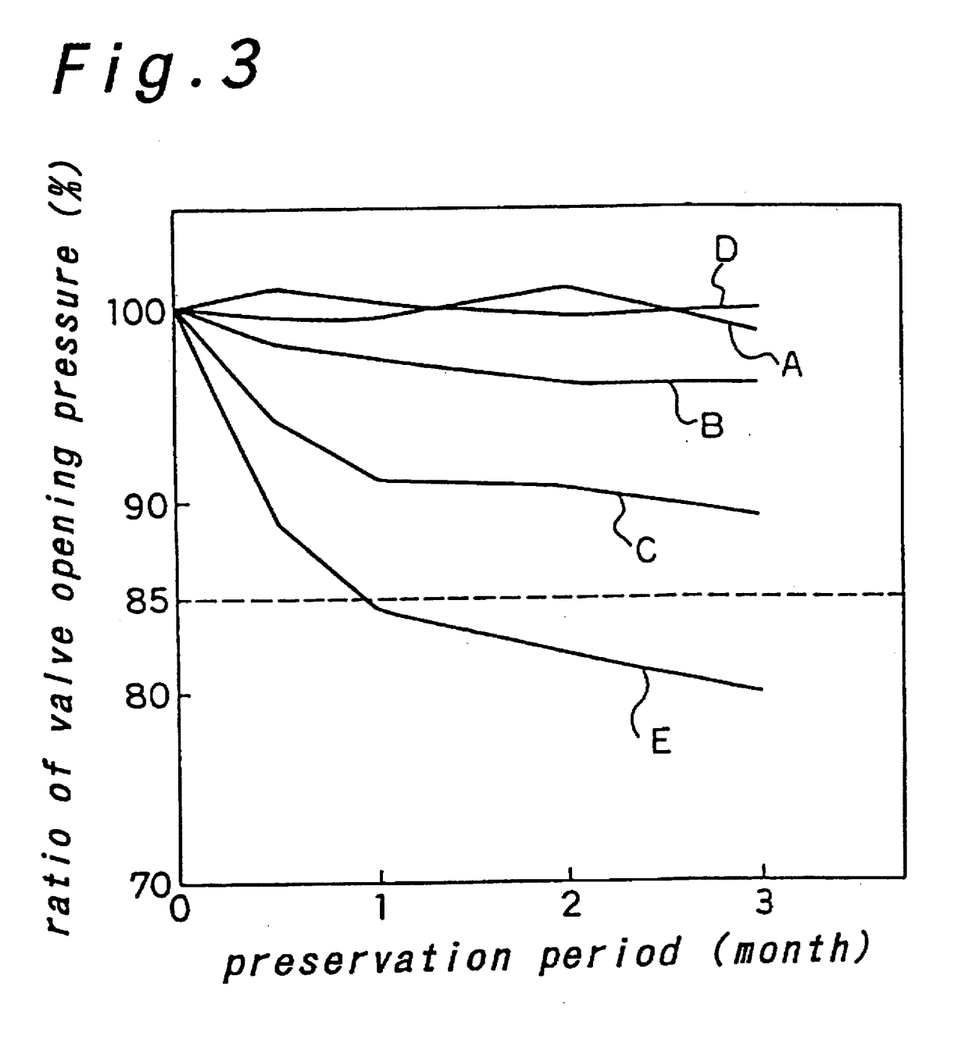
FIG. 3 is a characteristic graph illustrating a relation between a ratio of valve opening pressure and a preservation period of the same safety valve device.

Regarding five kinds of the safety valve devices A to E, a resistance to heat deterioration of the elastic valve element was examined. After the safety valve device was preserved under the environment of an atmospheric temperature of 65° C. for a certain period, the valve opening pressure was measured. A relation between the preservation period and the valve opening pressure is shown in FIG. 3. Regarding an index of a long-term reliability of the valve opening pressure of the safety valve device, not less than 85% of the initial valve opening pressure was used as a standard. As shown in FIG. 3, the safety valve devices A, B, C and D using elastic valve elements wherein polypropylene particles are dispersed in the ethylene-propylene elastomer show a small deterioration degree due to increased temperature in comparison with the safety valve device E using a conventional elastic valve element of only an ethylene-propylene elastomer. It is also found that the long-term heat resistance is improved by increasing the content of polypropylene particles in the elastic valve element. The reason for this is considered as follows. Because of the presence of polypropylene particles in the elastic valve element, oxidation of the ethylene-propylene elastomer is prevented and it becomes difficult for oxygen molecules to penetrate into the inside from the surface of the elastic valve element, and therefore, a breakage of the crosslinked structure of the ethylene-propylene elastomer due to oxidation deterioration is inhibited. Accordingly, when the content of polypropylene particles in the elastic valve element is not less than 5% by weight, a decrease in valve opening pressure can be inhibited and the valve opening pressure can be stabilized for a long period.

In such way, when the content of polypropylene particles to the ethylene-propylene elastomer is from 5 to 30% by weight, the thickness of the safety valve device can be reduced and, at the same time, the safety can be improved.

EXAMPLE 2

Using the same polypropylene as that of Example 1 as the thermoplastic resin particles dispersed in the ethylene-propylene elastomer of the elastic valve element, the following examination was conducted.

The polypropylene particles were mixed with a small amount of ethylene-propylene elastomer particles and, after coating the surface of the polypropylene particles with the ethylene-propylene elastomer, a suitable amount of EPDM and a vulcanizing agent were added furthermore, followed by mixing. Then, a mixture was produced so as to adjust a ratio of the polypropylene powder to the expected whole elastic valve element to 30% by weight, 15% by weight or 5% by weight. The resultant mixture was molded into a valve element shape and crosslinked by heating it at 180° C. for about 5 minutes to obtain an elastic valve element. The elastic valve element whose ratio of polypropylene particles is 30% by weight, 15% by weight or 5% by weight is referred to as a valve element F, G or H. The same thin safety valve device as that of Example 1 was made by using the elastic valve element thus obtained. The safety valve device using the valve element F, G or H is referred to as a safety valve device F, G or H, respectively.

A thickness of each valve element was 2.0 mm (50% of a thickness of an elastic valve element used for a conventional safety valve device) and a compressibility during installation of the safety valve device was set at 30%.

Using the safety valve devices F, G and H obtained as described above, A-size sealed nickel-metal hydride batteries each having a nominal capacity of 1600 mAh were produced. These batteries are referred to as batteries "f", "g" and "h", respectively.

Three kinds of the above batteries "f", "g" and "h" (50 batteries for each) were subjected to a breakage test on the assumption of control failure of a battery charger while performing a continuous overcharge at a current of 8 A (corresponding to 5 C). The results are shown in Table 2 and FIG. 4.

TABLE 2

| Kind of battery | 8 A continuous overcharge | |
|---|---|---|
| | number of batteries broken | number of batteries causing ignition |
| Battery f | 0/50 | 0/50 |
| Battery g | 0/50 | 0/50 |
| Battery h | 0/50 | 0/50 |

As shown in Table 2, no breakage or ignition was observed in each of the batteries "f", "g" and "h".

Figure 4:
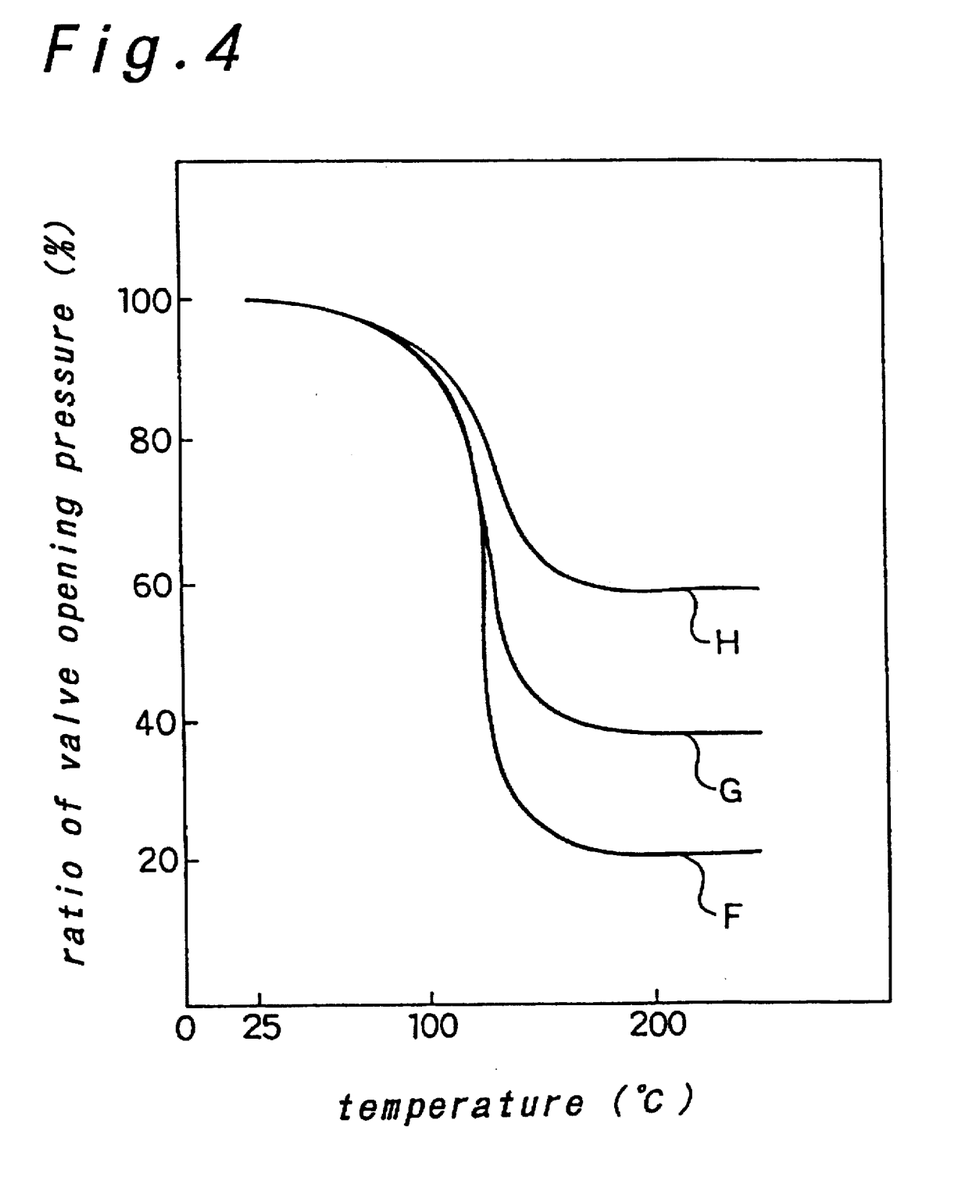
FIG. 4 is a characteristic graph illustrating a relation between a ratio of valve opening pressure of a safety valve device for a battery as another embodiment and a temperature.

As shown in FIG. 4, the valve elements F, G and H made by such a process show the same characteristics as those of the valve elements A, B and C made by directly mixing the resin particles with EPDM used in Example 1.

As is described in this Example, the resin particles can be easily dispersed in the ethylene-propylene elastomer by mixing the resin particles, whose surface has previously been coated with the ethylene-propylene elastomer, with EPDM, followed by crosslinking EPDM in this mixture.

Figure 5:
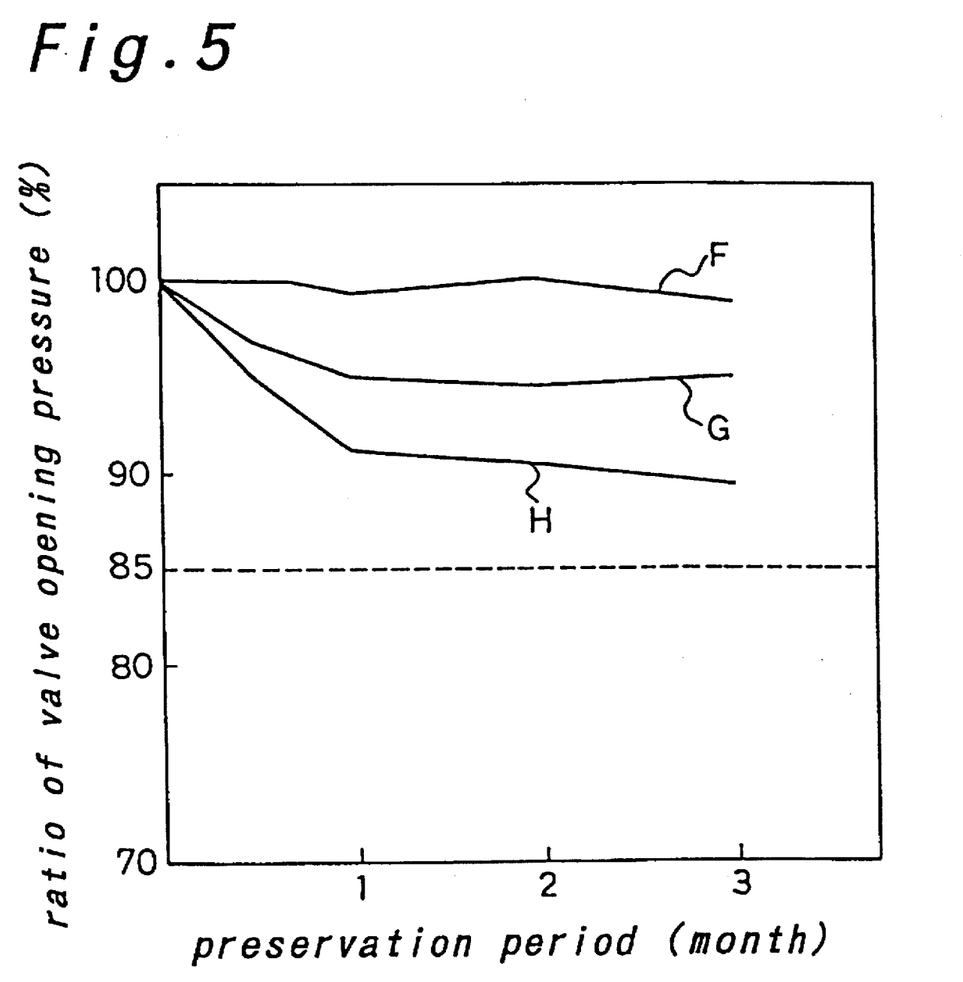
FIG. 5 is a characteristic graph illustrating a relation between a ratio of valve opening pressure and a preservation period of the same safety valve device.

Regarding three kinds of safety valve devices F, G and H, a resistance to heat deterioration of the elastic valve element was examined. After the safety valve device was preserved under the environment of an atmospheric temperature of 65° C. for a certain period, the valve opening pressure was measured. A relation between the preservation period and a ratio of valve opening pressure is shown in FIG. 5. Regarding an index of a long-term reliability of the valve opening pressure of the safety valve device, not less than 85% of the initial valve opening pressure was used as a standard. As is apparent from FIG. 5, each of the safety valve devices F, G and H using an elastic valve element wherein polypropylene particles are dispersed in the ethylene-propylene elastomer shows a small deterioration degree due to increased temperature. It is also found that the long-term heat resistance is improved by increasing the content of polypropylene particles in the elastic valve element. The reason for this is considered as follows. When the mixing ratio Of polypropylene particles is not less than 5% by weight, oxidation deterioration of the ethylene-propylene elastomer is inhibited by the polypropylene particles and the valve opening pressure can be maintained and, therefore, a safety valve device having a long-term reliability can be provided.

EXAMPLE 3

Kinds of thermoplastic resin particles to be dispersed in the ethylene-propylene elastomer of the elastic valve element were examined.

As the resin particles, polypropylene, polystyrene and polyamide (nylon 6) were used, respectively. Any one of the above resin particles was mixed with EPDM so that the resin particles occupy 15% by weight, and then the mixture was molded by heating to obtain an elastic valve element. The elastic valve element using polypropylene, polystyrene or polyamide 6 is referred to as a valve element I, J or K, respectively. using the valve elements I, J and K, thin safety valve devices I, J and K were produced, respectively.

A safety valve device E using a valve element produced from only EPDM was made as the Conventional Example.

A thickness of each valve element was 2.0 mm and the elastic valve element was installed in the safety valve device by setting a compressibility in the thickness direction at 30%.

Using the safety valve devices E, I, J and K, A-size sealed nickel-metal hydride batteries each having a nominal capacity of 1600 mAh were produced. These batteries are referred to as batteries "e", "i", "j" and "k", respectively. Four kinds of the above batteries (50 batteries for each) were subjected to a breakage test on the assumption of control failure of a battery charger while performing a continuous overcharge at a current of 8 A (corresponding to 5 C).

TABLE 3

| Kind of battery | 8 A continuous overcharge | |
|---|---|---|
| | number of batteries broken | number of batteries causing ignition |
| Battery e | 48/50 | 0/50 |
| Battery i | 0/50 | 0/50 |
| Battery j | 0/50 | 0/50 |
| Battery k | 0/50 | 0/50 |

As shown in Table 3, no breakage or ignition was observed in the batteries "i", "j" and "k". To the contrary, regarding the battery "e" as the Conventional Example, of the 50 batteries, 48 batteries were broken.

This is because the gas exhaust capability of the safety valve device is lowered due to thermal expansion of the ethylene-propylene elastomer in the elastic valve element in an overcharged state resulting in occluded state of the gas exhaust hole.

Figure 6:
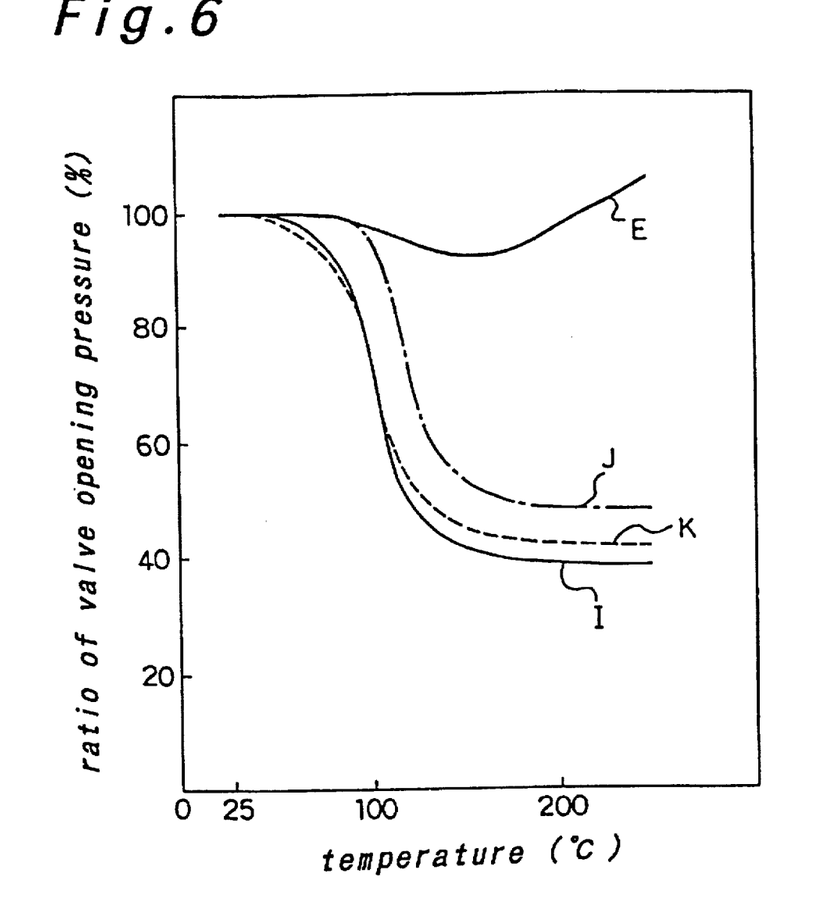
FIG. 6 is a characteristic graph illustrating a relation between a valve opening pressure and a preservation period of another safety valve device.

In order to confirm the above results, a change in valve opening pressure caused by an increase in temperature of the safety valve devices E, I, J and K was measured. The results are shown in FIG. 6. In FIG. 6, the valve opening pressure represents a ratio if a value at room temperature is defined as 100.

As shown in FIG. 6, the valve opening pressure of the safety valve device I, J or K of the present invention begins to decrease around 100° C. due to softening of the resin particles in the valve element and is lowered to 50 to 40% of the valve opening pressure at room temperature. At the temperature higher than that, the valve opening pressure keeps constant, which shows that the sealing capability of the elastic valve element which shuts the gas vent hole is maintained by the crosslinked ethylene-propylene elastomer. Accordingly, since the valve opening pressure is lowered by an increase in temperature, the valve element is liable to be deformed and the exhaust capability is improved. As a result, as shown in Table 3, high safety can be obtained if the safety valve device is installed in the battery. In a conventional safety valve device E, an increase in valve opening pressure shows the fact that the ethylene-propylene elastomer was expanded thermally by an increase in temperature and maintained the stage of the gas exhaust hole being shut off, whereby the exhaust capability was deteriorated. This endorses the results of Table 3.

EXAMPLE 4

The effect of the thickness of the elastic valve element was examined.

As the thermoplastic resin particles, the same polypropylene particles as those of Example 1 were used. Polypropylene particles were mixed with EPDM so that polypropylene particles occupy 15% by weight, and then the mixture was molded by heating to obtain elastic valve elements each having a thickness of 1.0 mm (valve element L), 2.0 mm (valve element M) and 3.0 mm (valve element N), respectively. Using these valve elements, safety valve devices L, M and N were produced, respectively.

As the Comparative Example, a safety valve device O using an elastic valve element having a thickness of 0.7 mm and the same composition as that of the above valve element was produced.

A compressibility in the thickness direction of each elastic valve element was set at 30% during installation of the safety valve device. Using the safety valve devices L, M, N and O, A-size sealed nickel-metal hydride batteries each having a nominal capacity of 1600 mAh were produced, respectively. These batteries are referred to as batteries "l", "m", "n" and "o", respectively.

Four kinds of the above batteries "l" to "o" (50 batteries for each) were subjected to a breakage test on the assumption of control failure of a battery charger while performing a continuous overcharge at a current of 8 A (corresponding to 5 C). The results are shown in Table 4.

TABLE 4

| Kind of battery | 8 A continuous discharge | |
|---|---|---|
| | number of batteries broken | number of batteries causing ignition |
| Battery l | 0/50 | 0/50 |
| Battery m | 0/50 | 0/50 |
| Battery n | 0/50 | 0/50 |
| Battery o | 21/50 | 0/50 |

As shown in Table 4, no breakage or ignition was observed in the batteries "l", "m" and "n" of the present invention. On the other hand, regarding the battery "o" as the Conventional Example, of the 50 batteries, 21 batteries were broken.

This is because the exhaust capability decreases due to small deformation of the elastic valve element in the safety valve device at the time of increased temperature or increased internal pressure of the battery in a state of being overcharged.

The thickness of the elastic valve element of the safety valve device varies depending on the size of the battery. As is apparent from the above results, high safety can be normally maintained when an elastic valve element having a thickness of not less than 1.0 mm is installed in a battery in a state free from compression.

EXAMPLE 5

The compressibility during installation in the valve chamber of the elastic valve element constituting the safety valve device was measured.

As the thermoplastic resin particles, the same polypropylene as that of the Example 1 was used. Polypropylene particles were mixed with EPDM so that the polypropylene particles occupy 15% by weight, and then the mixture was molded by heating to obtain an elastic valve element. The thickness of the elastic valve element was set at 2.0 mm. Using the elastic valve elements thus obtained, thin safety valve devices wherein the compressibility of the elastic valve element in the thickness direction during installation was set at 10%, 30% and 50%, respectively were produced.

As the Comparative Examples, a safety valve device S wherein the same elastic valve element was installed at a compressibility in the thickness direction of 5% and a safety valve device T wherein the same elastic valve element was installed at a compressibility in the thickness direction of 55% were produced, respectively.

Using the safety valve devices P to T, A-size sealed nickel-metal hydride batteries each having a nominal capacity of 1600 mAh were produced, respectively. These batteries are referred to as batteries "p", "q", "r" and "t", respectively.

Five kinds of the above batteries "p" to "t" (50 batteries for each) were subjected to a breakage test on the assumption of control failure of a battery charger while performing a continuous overcharge at a current of 8 A (corresponding to 5 C). The results are shown in Table 5.

TABLE 5

| Kind of battery | 8 A continuous discharge | |
|---|---|---|
| | number of batteries broken | number of batteries causing ignition |
| Battery p | 0/50 | 0/50 |
| Battery q | 0/50 | 0/50 |
| Battery r | 0/50 | 0/50 |
| Battery s | 0/50 | 0/50 |
| Battery t | 50/50 | 0/50 |

As shown in Table 5, neither breakage nor ignition was observed in the batteries "p", "q" and "r" as well as the battery "s" of the Comparative Example. On the other hand, regarding the battery "t" as the Conventional Example, all the 50 batteries were broken. The reason for this is considered as follows. That is, since the compressibility of the elastic valve element exceeded an elastic limit and the valve element lost the capability of the elastic body, the exhaust capability of the safety valve device disappeared under the condition of increased temperature and increased internal pressure of the batteries in a sate of being overcharged.

Preservation properties of five kinds of the batteries "p" to "t" (50 batteries for each) were evaluated under high-temperature high-humidity/low-temperature low-humidity environment according to MIL-STD-202F. The results are shown in Table 6.

TABLE 6

| Kind of battery | Number of batteries causing leakage in MIL-STD-202F test |
|---|---|
| Battery p | 0/50 |
| Battery q | 0/50 |
| Battery r | 0/50 |
| Battery s | 31/50 |
| Battery t | 0/50 |

As shown in Table 6, in the batteries "p", "q" and "r" as well as the battery "t" as the Comparative Example, no abnormality was observed. However, regarding the battery "s" as the Comparative Example, of the 50 batteries, 31 batteries caused a leakage of the electrolyte. The reason for this is considered as follows. That is, since the compressibility during installation of the elastic valve element in the safety valve device was low under an environment of low temperature, the elastic valve element shrank and airtightness of the gas vent hole as the safety valve device was not obtained, thereby causing a leakage of the electrolyte.

Accordingly, the valve opening pressure can be stabilized by installing the elastic valve element in a state of being compressed in the thickness direction within a compressibility of 10 to 50% during production of the thin safety valve device. Furthermore, the device is ready to deal with the trouble upon abnormal use of the battery, associated with a rapid increase in internal pressure of the battery due to increased temperature.

The resin particles to be dispersed in the ethylene-propylene elastomer may be any thermoplastic resin having a softening point lower than that of the ethylene-propylene elastomer, for example, there can be used olefin resins such as polybutylene, polyethylene, etc.; styrene resins such as acrylonitrile-butadienestyrene resin, etc.; and amide resins such as nylon 6-10, nylon 6-12, etc.

As described above, according to the present invention, there can be obtained a thin safety valve device having a high reliability which makes it possible to stably maintain a valve opening pressure for a long period and a high safety against a rapid increase in internal pressure caused by an increase in temperature of the battery. By using this thin safety valve device, a sealed battery having a large capacity as well as exceptional reliability and safety can be provided.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A sealed battery comprising a battery case containing a cell element, and a safety valve device installed at an opening part of said battery case in which said safety valve device includes:

a dish-shaped seal plate having a gas vent hole at a central part, a cap-shaped terminal having a gas exhaust hole fixed to said dish-shaped seal plate at a peripheral edge thereof, and an elastic valve element provided in a valve chamber formed in a space between said dish-shaped seal plate and said cap-shaped terminal, said valve element being in a compressed state, wherein said elastic valve element comprises an ethylene-propylene elastomer and thermoplastic resin particles dispersed in said ethylene-propylene elastomer, said thermoplastic resin particles have a softening point lower than that of said ethylene-propylene elastomer, and said thermoplastic resin particles contained in said elastic valve element occupy from 5 to 30% by weight of the whole elastic valve element.

2. A sealed battery comprising a battery case containing a cell element, and a safety valve device installed at an opening part of said battery case in which said safety valve device includes:

a dish-shaped seal plate having a gas vent hole at a central part, a cap-shaped terminal having a gas exhaust hole fixed to said dish-shaped seal plate at a peripheral edge thereof; and an elastic valve element provided in a valve chamber formed in a space between said dish-shaped seal plate and said cap-shaped terminal, said valve element being in a compressed state, wherein said elastic valve element comprises an ethylene-propylene elastomer and resin particles of at least one thermoplastic resin selected from the group consisting of an olefin resin, a styrene resin and art amide resin, dispersed in said ethylene-propylene elastomer, and said resin particles contained in said elastic valve element occupy from 5 to 30% by weight office whole elastic valve element.

3. The sealed battery in accordance with claim 2, wherein said olefin resin is polypropylene or polyethylene.

4. The sealed battery in accordance with claim 2, wherein said resin particles are provided with a coat layer of an ethylene-propylene elastomer on the surface thereof.

5. The sealed battery in accordance with claim 2, wherein a softening temperature of said resin particles is lower than that of said ethylene-propylene elastomer.

6. The sealed battery in accordance with claim 2, wherein a valve opening pressure of said safety valve device is lowered due to a plastic deformation of said elastic valve element caused by an increase in temperature.

7. The sealed battery in accordance with claim 2, wherein a valve opening pressure of said safety valve device at the temperature of 100° to 120° C. is 20 to 60% of the valve opening pressure at room temperature.

8. The sealed battery in accordance with claim 2, wherein said safety valve element has a thickness of not less than 1.0 mm under a normal pressure before incorporating into said safety valve device and is provided in the space constituting the valve chamber in a state of being compressed by an amount of 10 to 50% of the thickness under normal pressure.

9. A sealed battery comprising a battery case containing a cell element, and a safety valve installed at an opening part of said battery case in which said safety valve device includes:

a dish-shaped seal plate having a gas vent hole at a central part, a cap-shaped terminal having a gas exhaust hole fixed to said dish-shaped seal plate at a peripheral edge thereof, and an elastic valve element provided in a valve chamber formed in a space between said dish-shaped seal plate and said cap-shaped terminal, said valve element being in a compressed state, wherein said elastic valve element is produced by mixing resin particles of at least one thermoplastic resin selected from the group consisting of olefin resin, styrene resin and amide resin, and an ethylene-propylene elastomer material, molding the mixture into a predetermined shape and, at the same time, crosslinking the ethylene-propylene elastomer material, and said thermoplastic resin particles contained in said elastic valve element occupy from 5 to 30% by weight of the whole elastic valve element.

10. The sealed battery in accordance with claim 9, wherein a valve opening pressure of said safety valve device at the temperature of 100° to 120° C. is lowered to 60 to 20% of the valve opening pressure at room temperature.

11. A sealed battery comprising a battery case containing a cell element, and a safety valve installed at an opening part of said battery case, wherein said safety valve device includes:

a dish-shaped seal plate having a gas vent hole at a central part, a cap-shaped terminal having a vent hole, fixed to said dish-shaped seal plate at a peripheral edge thereof, and an elastic valve element provided in a valve chamber formed in a space between said dish-shaped seal plate and said cap-shaped terminal, said valve element being in a compressed state, wherein said elastic valve element has a thickness of not less than 1.0 mm and is provided in the space constituting the valve chamber in a state of being compressed by an amount of 10 to 50% the thickness.

* * * * *